(12) United States Patent
Selph et al.

(10) Patent No.: US 11,416,384 B1
(45) Date of Patent: Aug. 16, 2022

(54) SYSTEM AND METHOD FOR GENERATING AND EXECUTING AUTOMATED REGRESSION

(71) Applicant: JPMorgan Chase Bank, N.A., New York, NY (US)

(72) Inventors: David Selph, Darien, CT (US); Varigonda Hari Krishna, Nellore (IN); Subhashree Kalyanaraman, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/231,692

(22) Filed: Apr. 15, 2021

(30) Foreign Application Priority Data

Mar. 3, 2021 (IN) .............................. 202111008976

(51) Int. Cl.
| | |
|---|---|
| G06F 11/36 | (2006.01) |
| G06F 16/215 | (2019.01) |
| G06F 16/28 | (2019.01) |
| G06F 16/951 | (2019.01) |
| G06F 16/22 | (2019.01) |

(52) U.S. Cl.
CPC ...... *G06F 11/3688* (2013.01); *G06F 11/3608* (2013.01); *G06F 11/3684* (2013.01); *G06F 11/3692* (2013.01); *G06F 16/215* (2019.01); *G06F 16/2246* (2019.01); *G06F 16/285* (2019.01); *G06F 16/951* (2019.01)

(58) Field of Classification Search
CPC ............. G06F 11/3688; G06F 11/3608; G06F 11/3684; G06F 11/3692; G06F 16/285; G06F 16/2246; G06F 16/215; G06F 16/951
See application file for complete search history.

(56) References Cited

U.S. PATENT DOCUMENTS

| | | | |
|---|---|---|---|
| 2016/0283353 A1* | 9/2016 | Owen | ................. G06F 11/3684 |
| 2017/0177466 A1* | 6/2017 | Owen | ................. G06F 11/3688 |

OTHER PUBLICATIONS

Joni Salminen et al., Automatic Persona Generation for Online Content Creators: Conceptual Rationale and a Research Agenda, Feb. 9, 2019, [Retrieved on Apr. 4, 2022]. Retrieved from the internet: <URL: https://link.springer.com/content/pdf/10.1007/978-1-4471-7427-1.pdf> 174 Pages (135-160) (Year: 2019).*

* cited by examiner

*Primary Examiner* — Anibal Rivera
(74) *Attorney, Agent, or Firm* — Greenblum & Bernstein, P.L.C.

(57) ABSTRACT

Various methods, apparatuses/systems, and media for generating and executing automated regression are disclosed. A processor generates automated and unattended regression from behavioral analytics. The processor also generates generic persona definitions based on clustered customer attributes. The processor further auto-provisions users that match the attribute definition of the user or harvests the user from a pool of available users through a query language to find an appropriate user.

20 Claims, 11 Drawing Sheets

SYSTEM AND METHOD FOR GENERATING AND EXECUTING AUTOMATED REGRESSION

CROSS-REFERENCE TO RELATED APPLICATIONS

This application claims the benefit of priority from Indian Patent Application No. 202111008976, filed Mar. 3, 2021, which is herein incorporated by reference in its entirety.

TECHNICAL FIELD

This disclosure generally relates to generating and executing automated regression, and, more particularly, to methods and apparatuses for generating automated and unattended regression from behavioral analytics, generating generic persona definitions based on clustered customer attributes, and auto-provisioning of users that match the attribute definition of the user or harvesting the user from a pool of available users through a query language to find an appropriate user.

BACKGROUND

As software application becomes increasingly more complex, generating tests and testing such software application based on the tests also become more complex as a large number of unique combinations of paths and modules may be tested for each program. Conventional tools exist for generating tests for software application testing which generally require a significant amount of manual effort. Automation is an important aspect in any application development and maintenance and at the same time it is also time consuming to write scripts and maintain those. For example, regression testing a software application often requires thousands of man hours to maintain the scripts and keep them in-synch with new development as the product evolves.

In addition, typical test data may prove to be a major hurdle in implementing reliable test pipelines to validate the product throughout multiple stages in the test environment. For example, each "instance" of the product generally has different data, and keeping the user data in-synch can be a challenging task across large enterprise systems comprised of hundreds of individual components. Although synching users may be possible, but it may prove to be extremely time-consuming and may require constant maintenance. Further, it may be too slow to run thousands of tests many times a day, since the manual synching or even automated synching takes time or relies on synchronizing business events or batches as well. These variables adds additional difficulties in keeping in-synch in a reliable way.

Currently, keeping required users populated in a particular product instance can also be a challenge task, since each product may need to be tested with several dozen "Persona" profiles. Finding users and ensuring that they have the correct attributes needed for the test may be difficult in a single environment, and may increase in difficulty as more branches or environments are added. Typical test lifecycles may have thirty to forty different product databases, each having hundreds of unique components that each may have their own data stores. Synchronizing users across all of these different data stores may prove to be a big challenge, and they are related, and need to have references in each for the end to end testing to work.

SUMMARY

The present disclosure, through one or more of its various aspects, embodiments, and/or specific features or sub-components, provides, among other features, various systems, servers, devices, methods, media, programs, and platforms for implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user, but the disclosure is not limited thereto.

The exemplary methodology disclosed herein eliminates the need to maintain regression scripts from one version of the product to the next, making the testing more reliable and always keeping the tests up to date. It allows the developers to focus on "change" rather than existing functionality—allowing this framework to highlight any anomalies that may occur between one product build version and another.

The present disclosure, through one or more of its various aspects, embodiments, and/or specific features or sub-components, also provides, among other features, various systems, servers, devices, methods, media, programs, and platforms for generating personas and archetypes that allow for bypassing the problems of conventional systems and methods disclosed above by using a definition of the user—rather than the user itself, and then collecting pools of users in each database that match that definition. Exemplary embodiments utilize the user profile definition language to generate the required users through a series of user creation or identification, and then conditioning of that user to match the criteria needed. That is, the present disclosure, through one or more of its various aspects, embodiments, and/or specific features or sub-components, also provides, among other features, various systems, servers, devices, methods, media, programs, and platforms for auto-creating user populations to ensure that there are enough users matching the requirements in each instance of the product. According to exemplary embodiments, the process of creating or finding users and then conditioning those users to match the attributes needed on the user profile have been automated.

According to an aspect of the present disclosure, a method for generating automated and unattended regression from behavioral analytics by utilizing one or more processors and one or more memories is disclosed. The method may include: clustering user profile attributes data based on a common persona data from active customers using an application; recording behavioral analytics events data from the application based on the user profile attributes data; harvesting, in response to recording behavioral analytics events data, user journeys data taken by a pool of similar user profiles data; isolating each user journey data by splitting a user session into specific flows and actions; implementing a deduplication process to eliminate redundant data from each user journey data; augmenting each user journey data to fill in missing information and values based on the application's metadata or page inventory data; and outputting each user journey data in an executable human readable domain language that defines test scenarios and references profile attributes or generated test values.

According to another aspect of the present disclosure, wherein recording behavioral analytics events data may further include: highlighting elements on an application's screen interacted with.

According to yet another aspect of the present disclosure, wherein isolating each user journey data may further include: implementing an algorithm to flatten an application's screen navigation graph into a tree structure; and extracting uni-directional user journeys data.

According to a further aspect of the present disclosure, wherein augmenting the user journeys data may further include: identifying value types and what attributes they relate to in the profile.

According to an additional aspect of the present disclosure, wherein the executable human readable domain language is an executable Gherkin syntax, but the disclosure is no limited thereto.

According to yet another aspect of the present disclosure, the method may further include: replaying the test scenarios and references profile attributes or generated test values for testing the application using persona definition of a user with similar attributes.

According to an aspect of the present disclosure, a system for generating automated and unattended regression from behavioral analytics is disclosed. The system may include a repository that stores user profile attributes data; and a processor operatively coupled to the repository via a communication network. The processor may be configured to: access the repository to cluster the user profile attributes data based on a common persona data from active customers using an application; record behavioral analytics events data from the application based on the user profile attributes data; harvest, in response to recording behavioral analytics events data, user journeys data taken by a pool of similar user profiles data; isolate each user journey data by splitting a user session into specific flows and actions; implement a deduplication process to eliminate redundant data from each user journey data; augment each user journey data to fill in missing information and values based on the application's metadata or page inventory data; and output each user journey data in an executable human readable domain language that defines test scenarios and references profile attributes or generated test values.

According to another aspect of the present disclosure, wherein to record behavioral analytics events data, the processor may be further configured to: highlight elements on an application's screen interacted with.

According to yet another aspect of the present disclosure, wherein to isolate each user journey data, the processor mat be further configured to: implement an algorithm to flatten an application's screen navigation graph into a tree structure; and extract uni-directional user journeys data.

According to a further aspect of the present disclosure, wherein to augment the user journeys data, the processor may be further configured to: identify value types and what attributes they relate to in the profile.

According to another aspect of the present disclosure, wherein the processor may be further configured to: replay the test scenarios and references profile attributes or generated test values for testing the application using persona definition of a user with similar attributes.

According to an aspect of the present disclosure, a method for generating generic persona definitions from clustered customer attributes by utilizing one or more processors and one or more memories is disclosed. The method may include: clustering user profile attributes data based on a common persona data from active customers using an application; defining a query string which represents required values for the attributes based on the user profile attributes data; allocating users that match the defined query to corresponding persona in each system instance that needs to run test for the application; requesting a specific user for said persona when running the test so that an environment in which the test is running returns a valid user for said persona; and referencing any dynamic values in the test by using said specific user profile's attributes or values.

According to an aspect of the present disclosure, a system for generating generic persona definitions from clustered customer attributes is disclosed. The system may include a repository that stores user profile attributes data; and a processor operatively coupled to the repository via a communication network. The processor may be configured to: cluster user profile attributes data based on a common persona data from active customers using an application; define a query string which represents required values for the attributes based on the user profile attributes data; allocate users that match the defined query to corresponding persona in each system instance that needs to run test for the application; request a specific user for said persona when running the test so that an environment in which the test is running returns a valid user for said persona; and reference any dynamic values in the test by using said specific user profile's attributes or values.

According to an aspect of the present disclosure, a method for auto-provisioning of users or harvesting a user from a pool of available users by utilizing one or more processors and one or more memories is disclosed. The method may include: monitoring in place and checking users against corresponding attribute definition of the user; determining, in response to monitoring, a tally of healthy users matching required profile for all downstream environments; creating, in response to determining, an executable human readable domain language that defines test scenarios and references profile attributes or generated test values; executing the test scenarios and providing test results; and triaging and providing feedback based on analyzing the test results.

According to another aspect of the present disclosure, wherein when a user does not match the required profile, the method may further include: removing the user that does not match the required profile from the pool of available users; and sending a request to an auto-provisioning/conditioning engine to heal and have its attributes be restored to the correct state.

According to yet another aspect of the present disclosure, wherein when a persona user count is low, the method may further include: sending a request to an auto-provisioning/conditioning engine to create a new user profile to match the user profile requirements.

According to a further aspect of the present disclosure, wherein the required steps to create necessary user attributes is non-deterministic and requires multiple tries over a period of time.

According to an additional aspect of the present disclosure, the method may further include: tracking the period of time; and abandoning the steps to create necessary user attributes when count of errors exceed a predetermined count or the period of time exceeds a predetermined time.

According to yet another aspect of the present disclosure, wherein in creating the new user profile, the method may further include: calling a series of application programming interface (API) to source systems; and conditioning the new user profile to meet the profile needs by calling additional APIs on the source systems.

According to an aspect of the present disclosure, wherein when a new user profile is created, the method may further include: adding the new user profile to the pool of available users for performing the process of matching of attribute definition or the process of archetype query for harvesting the new user from the pool of available users; and regularly checking the new user against corresponding attribute definition of the user.

According to an aspect of the present disclosure, a system for auto-provisioning of users or harvesting a user from a pool of available users is disclosed. The system may include a repository that stores attribute definitions of users; and a processor operatively coupled to the repository via a communication network. The processor may be configured to: monitor in place and check users against corresponding attribute definition of the user; determine, in response to monitoring, a tally of healthy users matching required profile for all downstream environments; create, in response to determining, an executable human readable domain language that defines test scenarios and references profile attributes or generated test values, execute the test scenarios and provide test results; and triage and provide feedback based on analyzing the test results.

According to another aspect of the present disclosure, wherein when a user does not match the required profile, the processor may be further configured to: remove the user that does not match the required profile from the pool of available users; and send a request to an auto-provisioning/conditioning engine to heal and have its attributes be restored to the correct state.

According to yet another aspect of the present disclosure, wherein a persona user count is low, the processor may be further configured to: send a request to an auto-provisioning/conditioning engine to create a new user profile to match the user profile requirements.

According to an additional aspect of the present disclosure, the processor may be further configured to: track the period of time; and abandon the steps to create necessary user attributes when count of errors exceed a predetermined count or the period of time exceeds a predetermined time.

According to yet another aspect of the present disclosure, wherein in creating the new user profile, the processor may be further configured to: call a series of application programming interface (API) to source systems; and condition the new user profile to meet the profile needs by calling additional APIs on the source systems.

According to an aspect of the present disclosure, wherein when a new user profile is created, the processor may be further configured to: add the new user profile to the pool of available users for performing the process of matching of attribute definition or the process of archetype query for harvesting the new user from the pool of available users; and regularly check the new user against corresponding attribute definition of the user.

BRIEF DESCRIPTION OF THE DRAWINGS

The present disclosure is further described in the detailed description which follows, in reference to the noted plurality of drawings. by way of non-limiting examples of preferred embodiments of the present disclosure, in which like characters represent like elements throughout the several views of the drawings.

DETAILED DESCRIPTION

Figure 1:
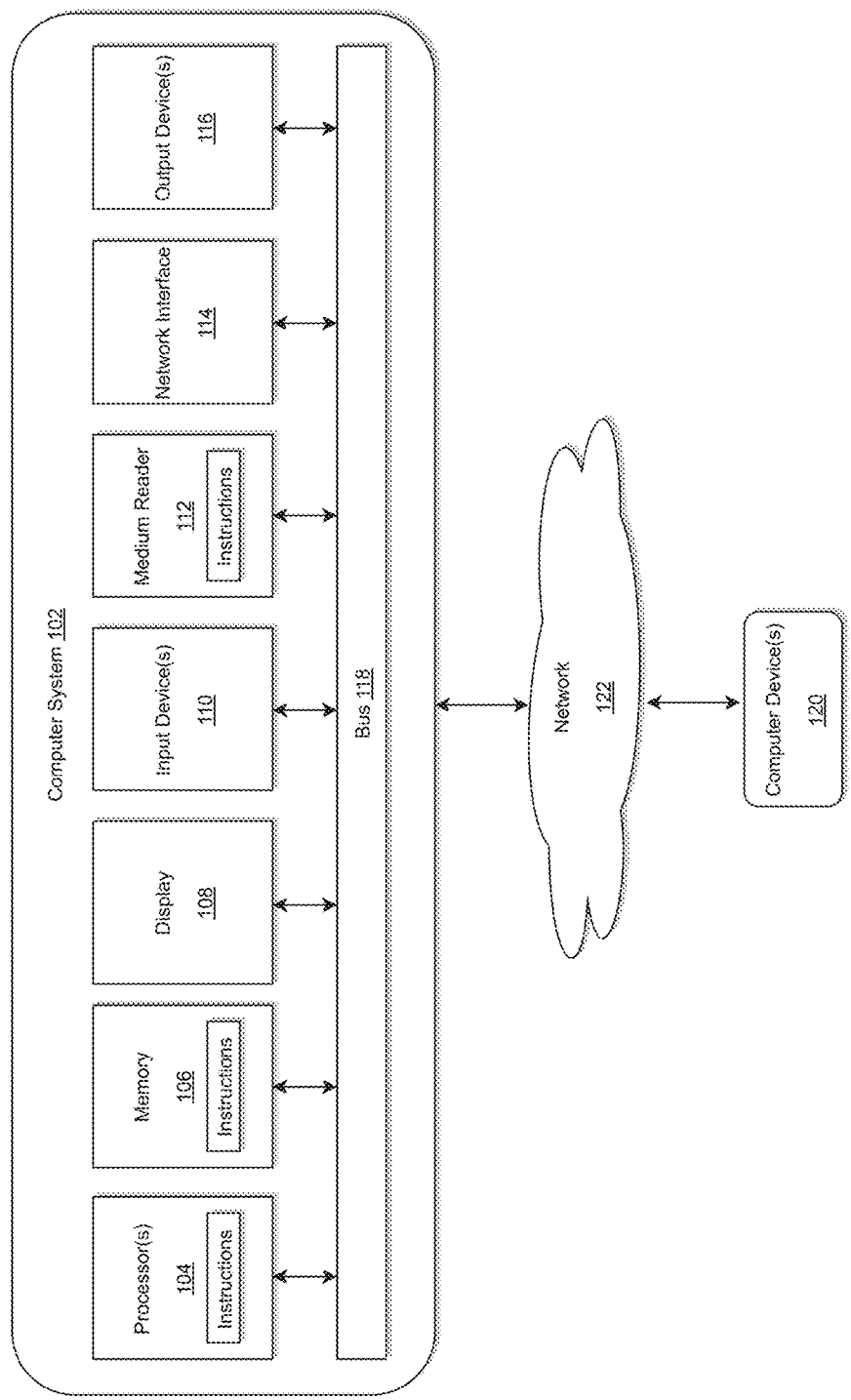
FIG. 1 illustrates a computer system for implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, engines, units and/or modules. Those skilled in the art will appreciate that these blocks, engines, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, engines, units and/or modules being implemented by microprocessors or similar, they may be programmed using software (e.g., microcode) to perform various functions discussed herein and may optionally be driven by firmware and/or software. Alternatively, each block, engine, unit and/or module may be implemented by dedicated hardware, or as a combination of dedicated hardware to perform some functions and a processor (e.g., one or more programmed microprocessors and associated circuitry) to perform other functions. Also, each block. engine, unit and/or module of the example embodiments may be physically separated into two or more interacting and discrete blocks, engines, units and/or modules without departing from the scope of the inventive concepts. Further, the blocks, engines, units and/or modules of the example embodiments may be physically combined into more complex blocks, engines, units and/or modules without departing from the scope of the present disclosure.

FIG. 1 is an exemplary system for use in implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk. a cache, a removable disk, tape. compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user, but the disclosure is not limited thereto.

Figure 2:
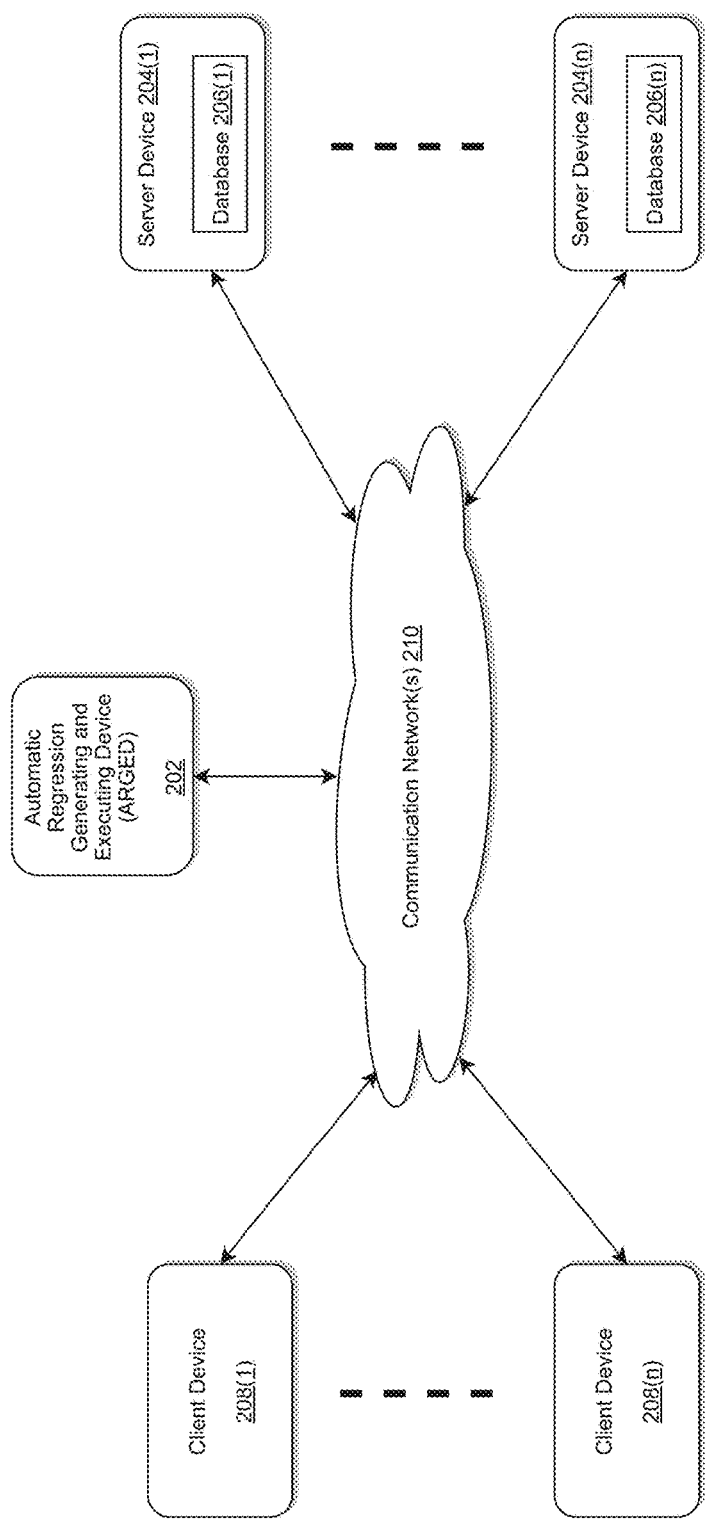
FIG. 2 illustrates an exemplary diagram of a network environment with an automatic regression generating and executing device in accordance with an exemplary embodiment.

Referring to FIG. 2, a schematic of an exemplary network environment 200 for implementing an automatic regression generating and executing device (ARGED) of the instant disclosure is illustrated.

According to exemplary embodiments, the above-described problems associated with conventional method and systems may be overcome by implementing an ARGED 202 as illustrated in FIG. 2 by implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user, but the disclosure is not limited thereto.

The ARGED 202 may be the same or similar to the computer system 102 as described with respect to FIG. 1.

The ARGED 202 may store one or more applications that can include executable instructions that, when executed by the ARGED 202, cause the ARGED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARGED 202 itself, may be located in virtual server(s) running in a cloud-based computing environment rather than being tied to one or more specific physical network computing devices. Also, the application(s) may be running in one or more virtual machines (VMs) executing on the ARGED 202. Additionally, in one or more embodiments of this technology, virtual machine(s) running on the ARGED 202 may be managed or supervised by a hypervisor.

In the network environment 200 of FIG. 2, the ARGED 202 is coupled to a plurality of server devices 204(1)-204(n) that hosts a plurality of databases 206(1)-206(n), and also to a plurality of client devices 208(1)-208(n) via communication network(s) 210. A communication interface of the ARGED 202, such as the network interface 114 of the computer system 102 of FIG. 1, operatively couples and communicates between the ARGED 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARGED 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARGED 202 may be a standalone device or integrated with one or more other devices or apparatuses, such as one or more of the server devices 204(1)-204(n), for example. In one particular example, the ARGED 202 may be hosted by one of the server devices 204(1)-204(n), and other arrangements are also possible. Moreover, one or more of the devices of the ARGED 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ARGED 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ARGED 202 that may be configured for implementing an automatic regression generating and executing module for generating automated and unattended regression from behavioral analytics, generating generic persona definitions based on clustered customer attributes, and auto-provisioning of users that match the attribute definition of the user or harvesting the user from a pool of available users through a query language to find an appropriate user, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the ARGED 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ARGED 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARGED 202, the server devices 204(1)-204(n), or the client devices 208(1)-208(n), for example, may be configured to operate as virtual instances on the same physical machine. For example, one or more of the ARGED 202, the server devices 204(1)-204(n), or the client devices 208(1)-208(n) may operate on the same physical device rather than as separate devices communicating through communication network(s) 210. Additionally, there may be more or fewer ARGEDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
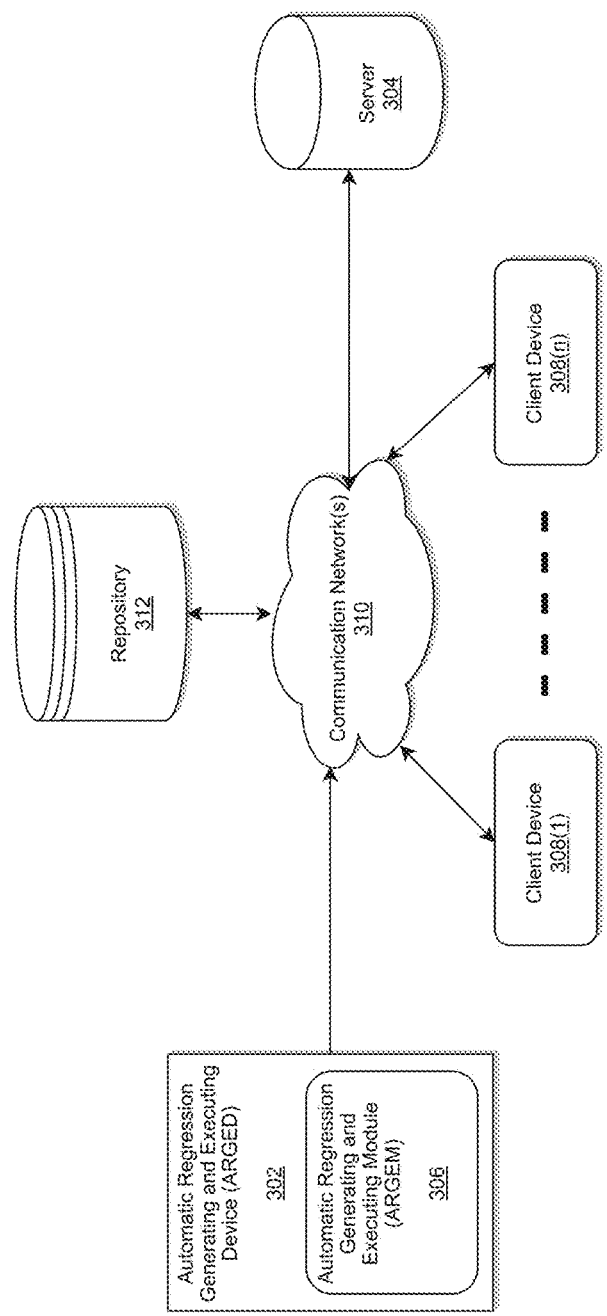
FIG. 3 illustrates a system diagram for implementing an automatic regression generating and executing device with an automatic regression generating and executing module in accordance with an exemplary embodiment.

FIG. 3 illustrates a system diagram for implementing an ARGED with an ARGEM in accordance with an exemplary embodiment.

As illustrated in FIG. 3, the ARGED 302 including the ARGEM 306 may be connected to a server 304, and a repository 312 via a communication network 310. The ARGED 302 may also be connected to a plurality of client devices 308(1)-308(n) via the communication network 310, but the disclosure is not limited thereto. According to exemplary embodiments, the ARGEM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the ARGED 302 is described and shown in FIG. 3 as including the ARGEM 306, although it may include other rules, policies, modules, databases, or applications, for example. According to exemplary embodiments, the repository 312 may be embedded within the ARGED 302. Although only one repository 312 is illustrated in FIG. 3, according to exemplary embodiments, a plurality of repositories 312 may be provided. The repository 312 may include one or more memories configured to store login information, data files, data content, API specification definition file, user profile data, user profile attributes data, attribute definitions of users, etc., but the disclosure is not limited thereto. According to exemplary embodiments, the ARGEM 306 may be configured to be storage platform agnostic—configured to be deployed across multiple storage layers.

According to exemplary embodiments, the ARGEM 306 may be configured to receive continuous feed of data from the repository 312 and the server 304 via the communication network 310.

As will be described below, the ARGEM 306 may be configured to access the repository 312 to cluster the user profile attributes data based on a common persona data from active customers using an application; record behavioral analytics events data from the application based on the user profile attributes data; harvest, in response to recording behavioral analytics events data, user journeys data taken by a pool of similar user profiles data; isolate each user journey data by splitting a user session into specific flows and actions; implement a deduplication process to eliminate redundant data from each user journey data; augment each user journey data to fill in missing information and values based on the application's metadata or page inventory data; and output each user journey data in an executable human readable domain language that defines test scenarios and references profile attributes or generated test values, but the disclosure is not limited thereto.

For example, as will be described below, the ARGEM 306 may also be configured to access the repository 312 to cluster user profile attributes data based on a common persona data from active customers using an application; define a query string which represents required values for the attributes based on the user profile attributes data; allocate users that match the defined query to corresponding persona in each system instance that needs to run test for the application, request a specific user for said persona when running the test so that an environment in which the test is running returns a valid user for said persona; and reference any dynamic values in the test by using said specific user profile's attributes or values, but the disclosure is not limited thereto.

For example, as will be described below, the ARGEM 306 may also be configured to access the repository 312 to monitor in place and check users against corresponding attribute definition of the user; determine, in response to monitoring, a tally of healthy users matching required profile for all downstream environments; create, in response to determining, an executable human readable domain language that defines test scenarios and references profile attributes or generated test values; execute the test scenarios and provide test results; and triage and provide feedback based on analyzing the test results, but the disclosure is not limited thereto.

The plurality of client devices 308(1)-308(n) are illustrated as being in communication with the ARGED 302. In this regard, the plurality of client devices 308(1)-308(n) may be "clients" of the ARGED 302 and are described herein as such. Nevertheless, it is to be known and understood that the plurality of client devices 308(1)-308(n) need not necessarily be "clients" of the ARGED 302, or any entity described in association therewith herein. Any additional or alternative relationship may exist between either or more of the plurality of client devices 308(1)-308(n) and the ARGED 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the ARGED 302 via broadband or cellular communication. Of course, these embodiments are merely exemplary and are not limiting or exhaustive.

Figure 4:
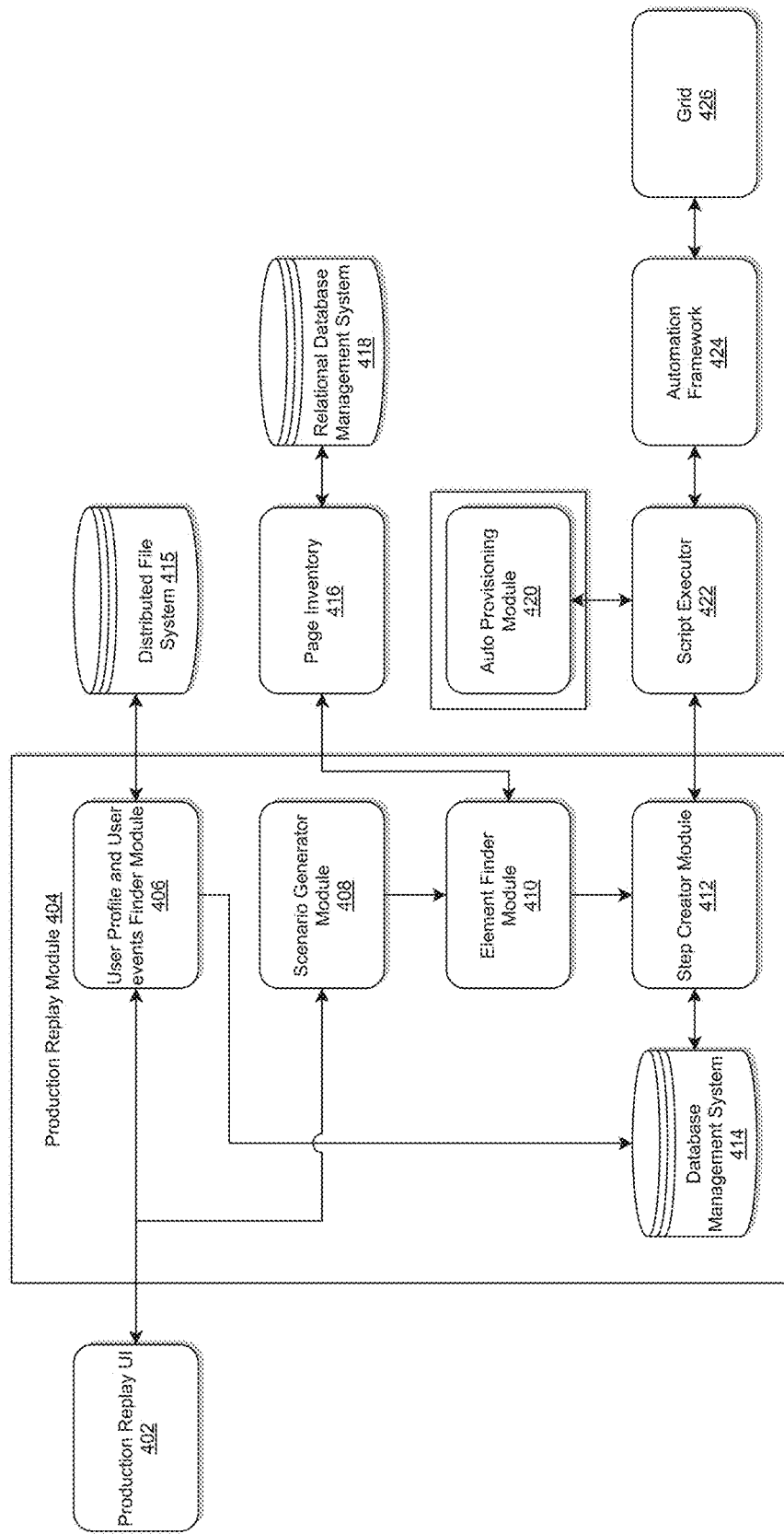
FIG. 4 illustrates a high level architecture diagram in accordance with an exemplary embodiment.
Figure 5A:
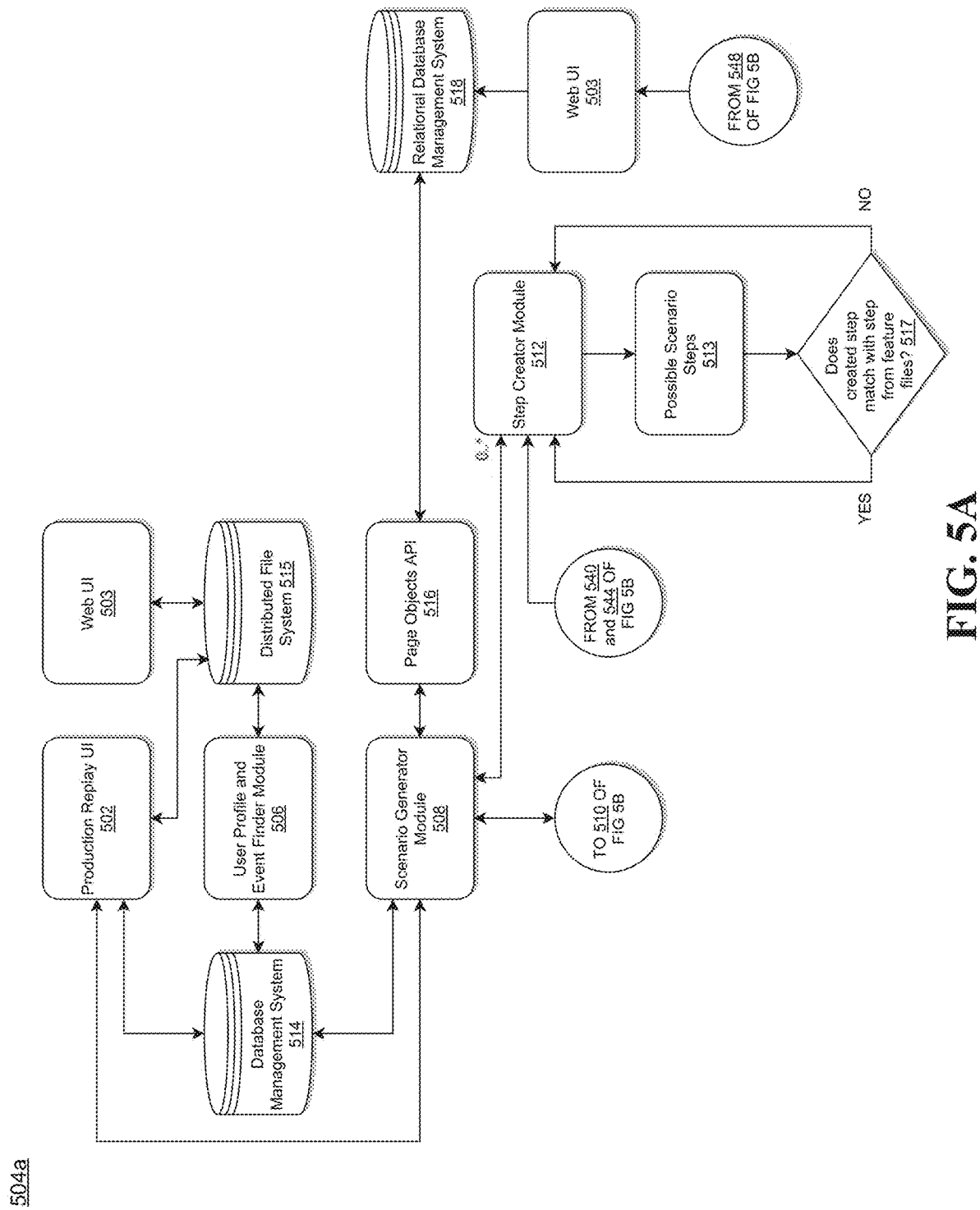
FIG. 5A and FIG. 5B illustrate a production replay module of FIG. 4 in accordance with an exemplary embodiment.
Figure 5B:
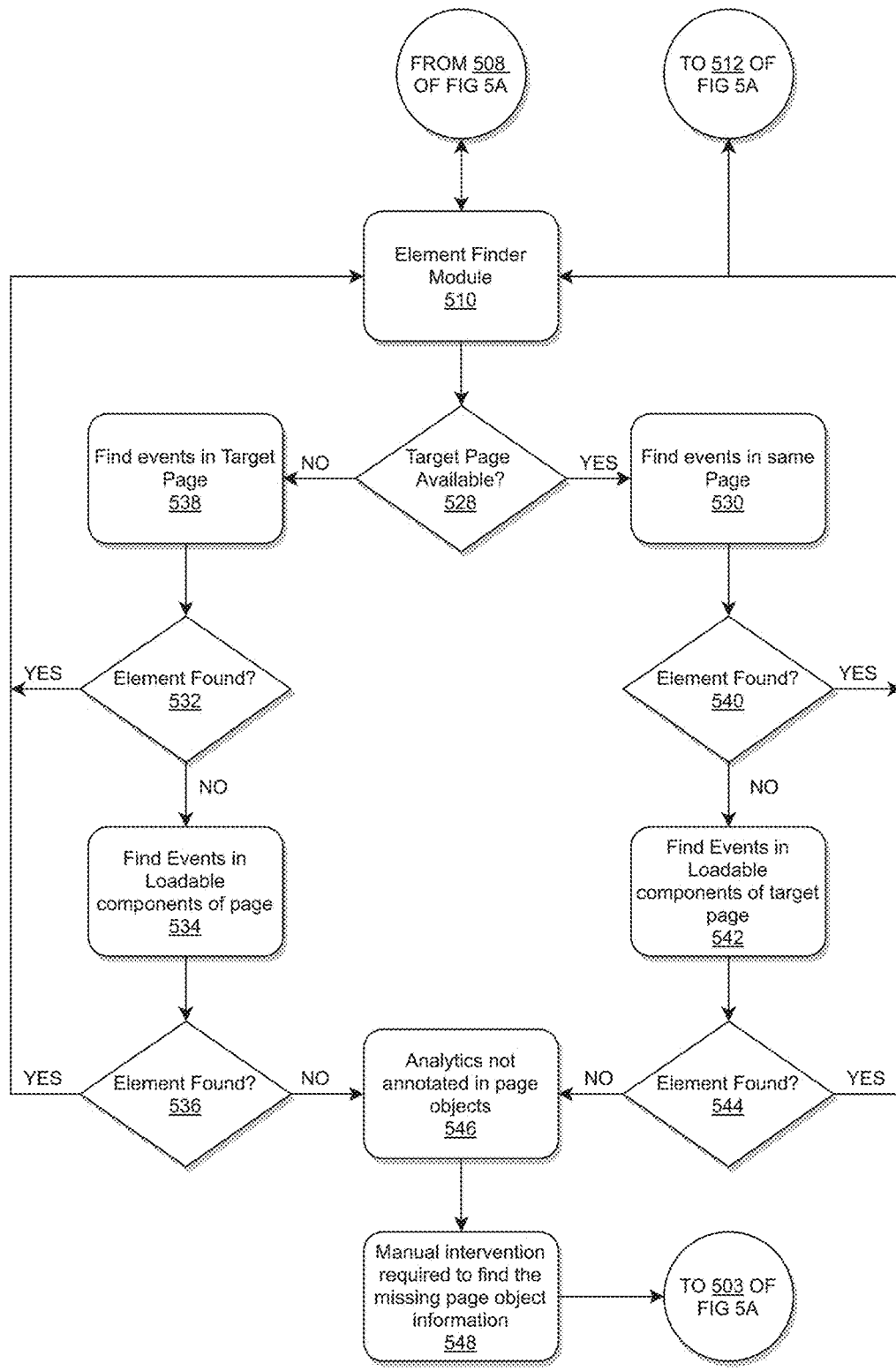
Figure 6A:
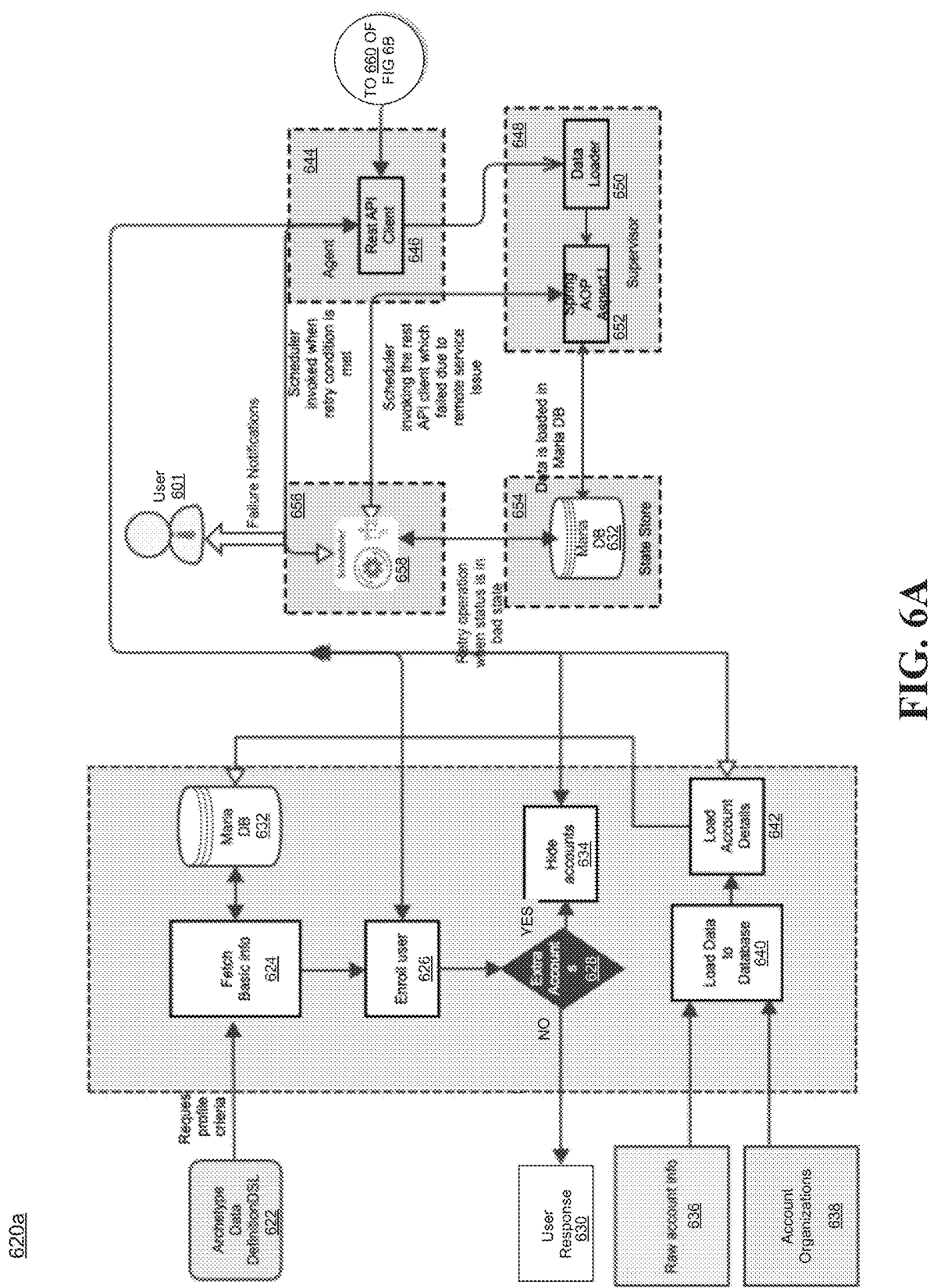
FIG. 6A and FIG. 6B illustrate an auto provisioning module of FIG. 4 in accordance with an exemplary embodiment.
Figure 6B:
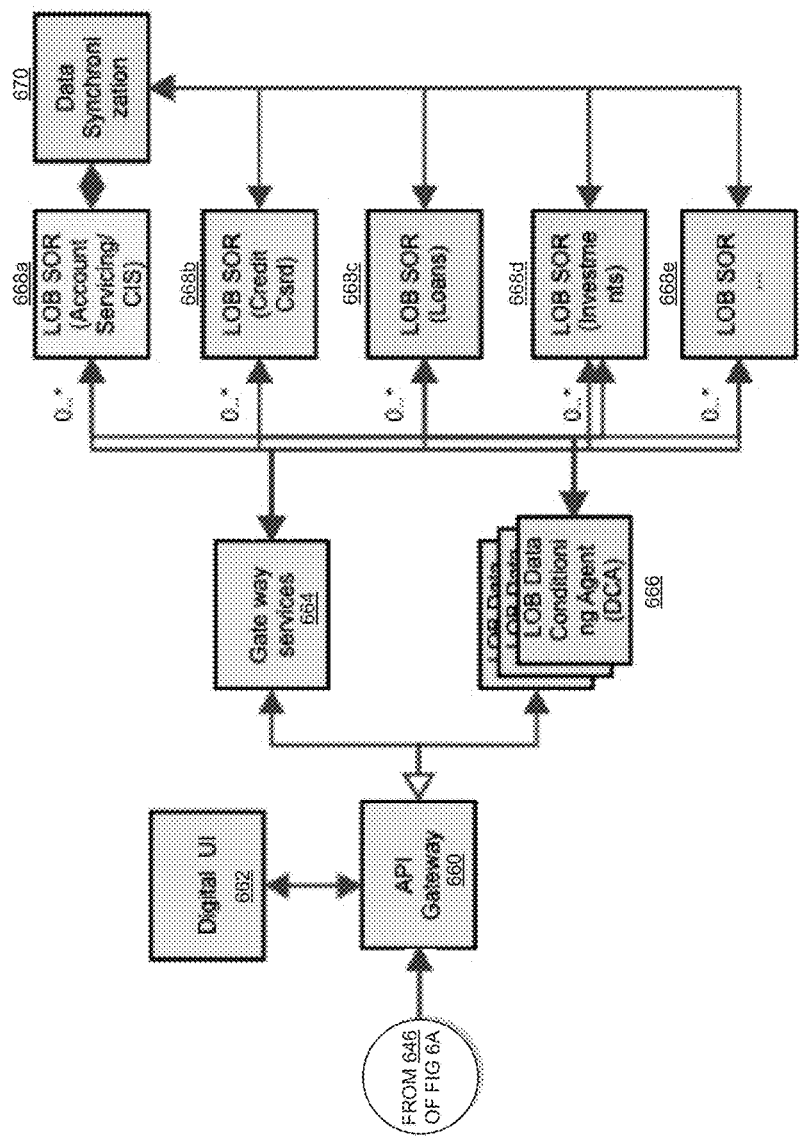

FIG. 4 illustrates a high level architecture diagram in accordance with an exemplary embodiment. FIG. 5A and FIG. 5B illustrate a production replay module of FIG. 4 in accordance with an exemplary embodiment. FIG. 6A and FIG. 6B illustrate an auto provisioning module of FIG. 4 in accordance with an exemplary embodiment.

FIG. 4 illustrates a system diagram for implementing an ARGEM of FIG. 3 in accordance with an exemplary embodiment. As illustrated in FIG. 4, the system 400 may include a production replay module 404 that may include a user profile and user events finder module 406, a scenario generator module 408, an element finder module 410, a step creator module 412, and a database management system 414.

According to exemplary embodiments, the user profile and user events finder module 406 may be operatively and bi-directionally connected to the production replay user interface (UI) 402 and the distributed file system 415 for data flow. The user profile and user events finder module 406 may also be operatively connected to the database management system 414 for data flow. Data generated (i.e., events, user profiles) may be stored onto the database management system 414 for data flow.

According to exemplary embodiments, the scenario generator module 408 may be operatively and bi-directionally connected to the production replay UI 402 for data flow. The scenario generator module 408 may be operatively connected to the element finder module 410 for data flow. Data from the scenario generator module 408 may flow to the element finder module 410. The element finder module 410 may be operatively and bi-directionally connected to a page inventory 416 for data flow. The element finder module 410 may be operatively connected to the step creator module 412 for data flow. Data from the element finder module 410 may flow to the step creator module 412. The page inventory 416 may be operatively and bi-directionally connected to a relational database management system 418 for data flow.

According to exemplary embodiments, the step creator module 412 may be operatively and bi-directionally connected to the database management system 414 and a script executor 422 for data flow. The script executor 422 may be operatively and bi-directionally connected to an auto provisioning module 420 and automation framework 424 for data flow. The automation framework 424 may be operatively and bi-directionally connected to a Grid 426 for data flow.

Automation is important aspect in any application development and maintenance and at the same time it also time consuming to write scripts and maintain those. According to exemplary embodiments, the ARGEM 306 may be configured to implement all the modules and engines disclosed with reference to FIGS. 4-9 to address those issues associated with conventional approach with easy script creation by saving thousands of human hours. The ARGEM 306 may also be configured to increase test coverage. For example, a user can utilize the ARGEM 306 and can select any user and ask the system to open browser. Then one needs to navigate to different pages which he/she intends to create automation scripts. Remaining part of creating scripts will be automatically taken care by the ARGEM 306 and corresponding tools illustrated in FIGS. 4-9.

As illustrated in FIG. 4, the production replay UI 402 may be a user interface layer to the ARGEM 306 (may also be referred to as generate execute automated regression tool). According to exemplary embodiments, the production replay UI 402 may be configured to receive user input and visualization and reporting. One can use this user interface layer to take commands so that it will trigger backend APIs to fetch user profile information and analytics events. It can also display top user journeys from production. According to exemplary embodiments, it may be built using AngularJS Javascript framework.

According to exemplary embodiments, user profile may be a component that connects to the distributed file system 415 (i.e., Hadoop hive) using java and implement profiles clustering from production user profile attributes.

The scenario generator module 408 (may also be referred to as user journey generator) may be configured to harvest the user journey (sequence of analytics event which are trigged on each operation performed by human on website). Output of the scenario generator module 408 will be top user journeys from specific type of user profile. This component will insert this top user journey to the database management system (i.e., Cassandra) and display back to the production replay UI 402.

According to exemplary embodiments, the step creator module 412 may generate Gherkin steps. The script executor 422 (i.e., Gherkin script executor) is a component that is responsible for calling auto provisioning to create users in lower environment based on user profile fetched from production and call the automation framework 424 to execute scenarios. Result from each step will be stored to the database management system 414 for reporting purpose on production replay UI 402. The automation framework 424 may be a selenium framework which is having details of step definition by which the step creator module 412 creates Gherkin steps and capable of executing scenarios using Grid 426 and provide each step results whether it is fail or pass. The Grid 426 is capable of opening specific browser and execute scenarios and also capable of recording screens so that a user can check execution later point of time.

For example, FIG. 5A illustrates first portion 504a of the production replay module 404 of FIG. 4 and FIG. 5B illustrates second portion 504b of the production replay module 404 of FIG. 4 in accordance with an exemplary embodiment. Both the first portions 504a and the second portion 504b in combination forms the entirety of the production replay module 404 of FIG. 4.

As illustrated in FIG. 5A, the user profile and event finder module 506 may access the distributed file system 515 and the database management system to obtain data related to user profiles and events. The production reply UI 502 may be utilized for accessing and obtaining data from the distributed file system 515 and the database management system 514. The Web UI 503 may be utilized for accessing and obtaining data from the distributed file system 515. The scenario generator module 508 may access the database management system 514 to obtain data related to scenario. The scenario generator module 508 may also access the relational database management system 518 to obtain data via calling page objects API 516.

Referring to both FIGS. 5A and 5B, the scenario generator module 508 may be operatively and bi-directionally connected to the element finder module 510 and the step creator module 512. The relational database management system 518 and the distributed file system 515 may be operatively connected to the Web UI 503.

As illustrated in FIG. 5B, at block 528, it is determined whether target page is available. If yes, at block 530, the element finder module 510 finds events in same page. If no, at block 538, the element finder module 510 finds events in target page.

At block 532, it is determined whether element is found. If yes, the element finder module 510 may send the element to step creator module 512. If no, at block 534, the element finder module 510 finds events in loadable components of page.

At block 536, it is determined whether element is found. If yes, the element finder module 510 may send the element to step creator module 512. If no, at block 546, it is determined that analytics are not annotated in page objects, and therefore, at block 548 it is determined that manual intervention is required to find the missing page object information and send then the information is sent to the Web UI 503 which sends the information to the relational database management system 518.

At block 540, it is determined whether element is found. If yes, the element finder module 510 may send the element to step creator module 512. If no, at block 542, the element finder module 510 finds events in loadable components of target page.

At block 544, it is determined whether element is found. If yes, the element finder module 510 may send the element to step creator module 512. If no, at block 546, it is determined that analytics are not annotated in page objects, and therefore, at block 548 it is determined that manual intervention is required to find the missing page object information and send then the information is sent to the Web UI 503 which sends the information to the relational database management system 518.

According to exemplary embodiments, the element finder module 510 may receive raw events and page object information to pick element and pass element to the step creator module 512 to find correct step. As illustrated in FIG. 5A, the step creator module 512 picks the correct step definition from possible scenario steps 513 table based on event. At block 517, it is determined whether created step match with step from feature files. If yes, the step creator module proceed with created step. If no, the step creator module 512 restarts the step creating process. The step creator module 512 uses proper step definition based on the analytics event it is a click, change, dropdown selection, etc. Once the step is created by the step creator module 512, it checks if a similar step is present in the existing feature files. If not, then the step creator module 512 picks the step form the feature file.

According to exemplary embodiments, raw analytic events form the website gets stored onto the distributed file system 515. The production replay UI 502 obtains clustering profiles base on persona from production user profile attributes by accessing the distributed file system 515.

According to exemplary embodiments, the user profile and event finder module 506 fetches production analytic events from the distributed file system 515 and store the events to database management system 514. The scenario generator module 508 fetches events from the database management system 514 and uses API to get page object information for the analytics event. The scenario generator module 508 then saves scenarios to the database management system 514. According to exemplary embodiments, top user journeys form production may be displayed on the production replay UI 502.

FIG. 6A and FIG. 6B illustrate an auto provisioning module 420 of FIG. 4 in accordance with an exemplary embodiment. For example, FIG. 6A illustrates first portion 620a of the auto provisioning module 420 of FIG. 4 and FIG. 6B illustrates second portion 620b of the auto provisioning module 420 of FIG. 4 in accordance with an exemplary embodiment. Both the first portions 620a and the second portion 620b in combination forms the entirety of the auto provisioning module 420 of FIG. 4. Auto provisioning module 620a, 620b is responsible to create test users in lower environments based on production profile details by connecting to various system records and API gateways.

As illustrated in FIG. 6A. the archetype data definition DSL 622 is operatively connected to block 624 to fetch basic information based on requested profile criteria. The block 624 is operatively and bi-directionally connected to a relational database management system, i.e., Maria database 632. Block 626 enrolls user 601 by obtaining basic information data from block 624. At block 628, it is determined whether there is extra accounts. If no, at block 630, the user 601 responses. If yes, at block 634, the auto provisioning module 420 (or 620a, 620b) hides the accounts. At block 640, raw account information 636 and account organizations 638 are loaded to database. At block 642, account details are loaded. Block 642 is operatively and bi-directionally connected with an agent 644 which includes a Rest API client 646. The scheduler 656, 658 may be operatively and bi-directionally connected to the Rest API client 646, a state store 654 (i.e., Maria database 632) and a spring AOP AspectJ of a supervisor 648 which also includes a data loader 650. The Rest API client is also operatively connected to the data loader 650 of the supervisor 648. Data from the Spring AOP AspectJ may be loaded in the Maria database 632. The auto provisioning module 620a, 620b may retry operation when status is in bad state. According to exemplary embodiments the scheduler 656, 658 may be invoked when retry condition is met.

Accordingly to an exemplary use case, the scheduler 656, 658 may invoke the Rest API client 646 which failed due to remote service issue. Failure notifications may be sent to the user 601.

As illustrated in FIG. 6B, the Rest API client 646 may be connected to API gateway 660 which is operatively and bi-directionally connected to a digital UI 662. The API gateway 660 may be operatively and bi-directionally connected to gate way services 664 and a plurality of line of business data conditional agent 666. Both the gate way services 664 and a plurality of line of business (LOB) data conditional agent 666 may be operatively and bi-directionally connected to a plurality of LOB system of records (SORs) (i.e., account servicing CIS 668a, credit card 668b, loans 668c, investments 668d, and additional LOB SORs 668e). Each of the plurality of LOB SOR is also operatively and bi-directionally connected to data synchronization 670.

Figure 7:
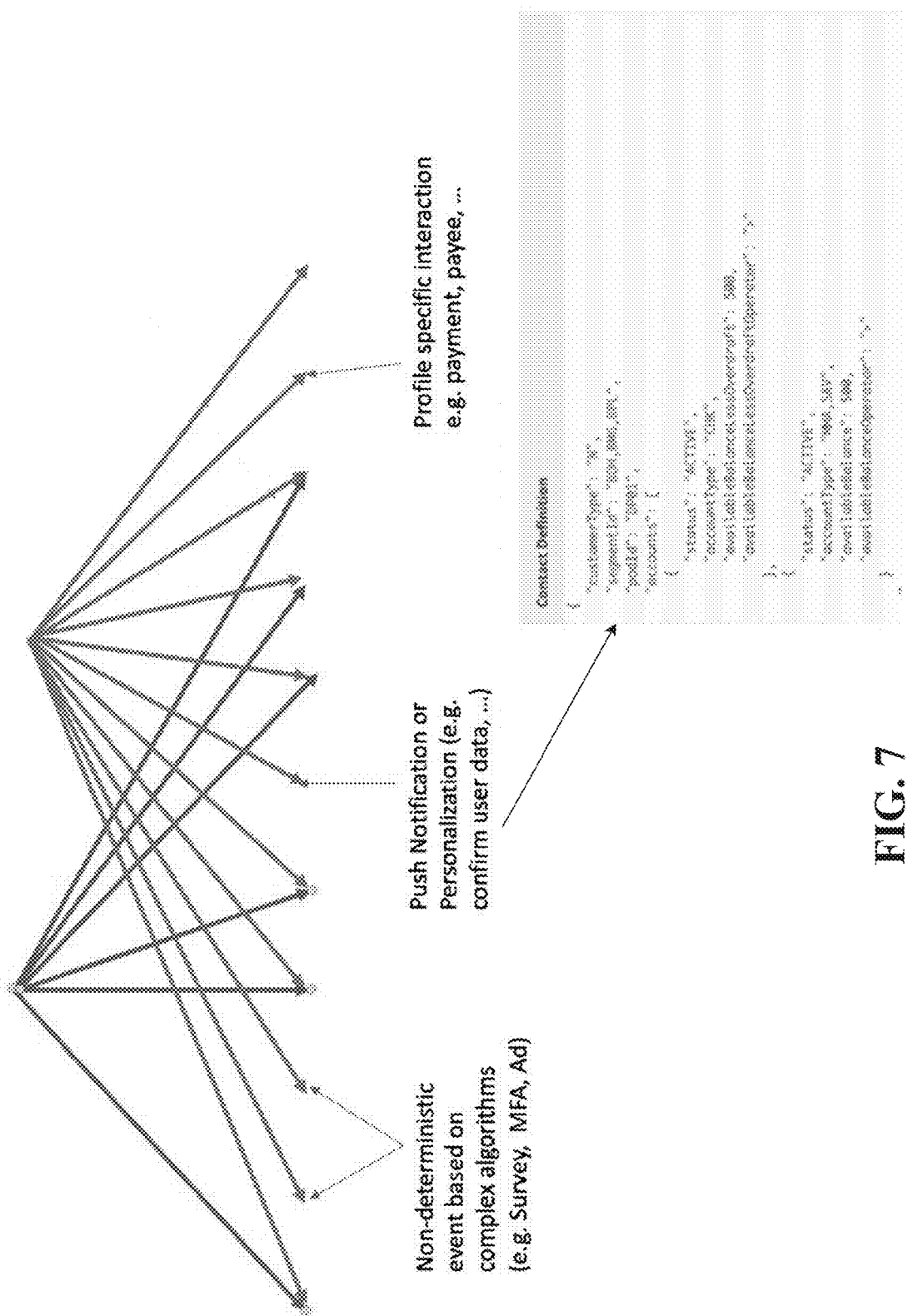
FIG. 7 illustrates an exemplary use case of automated and unattended regression from behavioral analytics in accordance with an exemplary embodiment.

FIG. 7 illustrates an exemplary use case 700 of automated and unattended regression from behavioral analytics in accordance with an exemplary embodiment. As illustrated in FIG. 7, replay behaviors may be displayed by the ARGEM 306 intelligently with domain bots. For example, the ARGEM 306 is configured to: provide non-deterministic event based on complex algorithms (e.g., Survey, MFA, Ad, etc., but the disclosure is not limited thereto); provide push notification or personalization (e.g., confirm user data); profile specific interaction (e.g., payment, payee), but the disclosure is not limited thereto.

Figure 8:
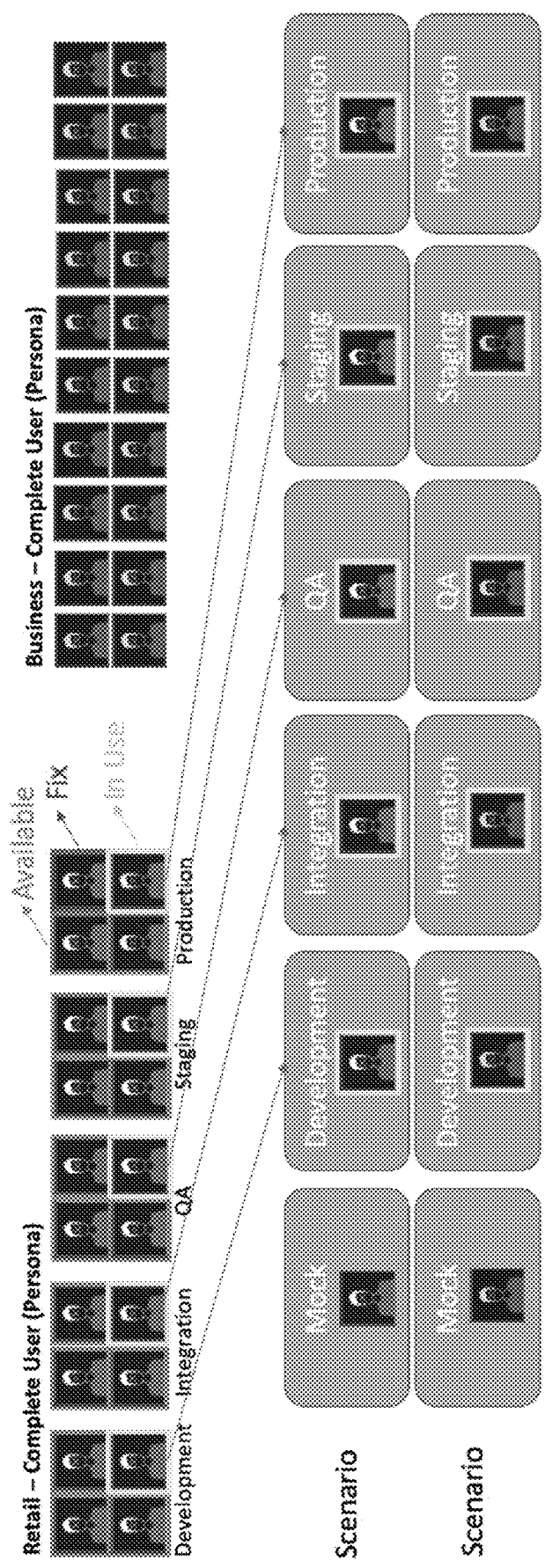
FIG. 8 illustrates an exemplary use case of generic persona definitions based on clustered customer attributes in accordance with an exemplary embodiment.

FIG. 8 illustrates an exemplary use case 800 of generic persona definitions based on clustered customer attributes in accordance with an exemplary embodiment. As illustrated in FIG. 8, the ARGEM 306 may be configured to utilize customer "Personas" to mimic segments of customer base—in any test environment and continue this consistency with fabricated bot production profiles. To maintain these, the ARGEM 306 is configured to automate processes that can create test user profiles with the attributes most commonly found for that user segment as needed on the fly.

Figure 9A:
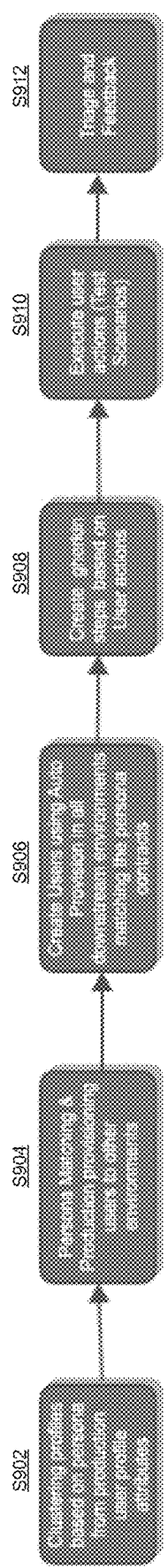
FIG. 9A illustrates a flow diagram for targeted user profile in accordance with an exemplary embodiment.

FIG. 9A illustrates a flow diagram for targeted user profile in accordance with an exemplary embodiment.

As illustrated in FIG. 9A, at step S902, the process 900a may perform the following: clustering profiles based on persona from production user profile attributes.

At step S904, the process 900a may perform the following: personal matching and production provisioning users to other environments.

At step S906, the process 900a may perform the following: create users using auto provision in all downstream environments matching the persona contracts.

At step S908, the process 900a may perform the following: create Gherkin steps based on user actions.

At step S910, the process 900a may perform the following: execute user action (test scenarios).

At step S912, the process 900a may perform the following: triage and provide feedback.

Figure 9B:
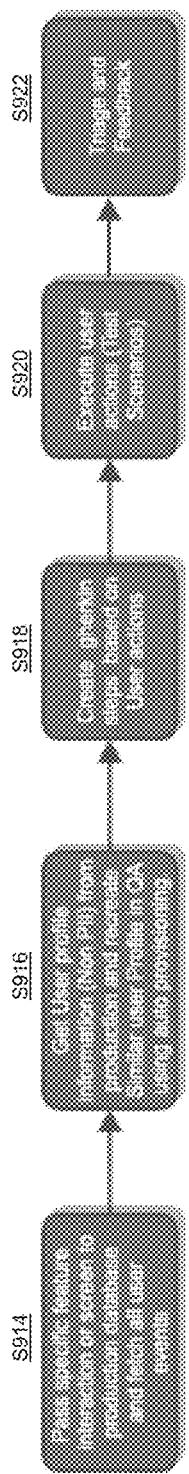
FIG. 9B illustrates a flow diagram for targeted feature from application in accordance with an exemplary embodiment.

FIG. 9B illustrates a flow diagram for targeted feature from application in accordance with an exemplary embodiment.

As illustrated in FIG. 9B, at step S914, the process 900b may perform the following: pass specific feature interaction or screen to production database and fetch all user events.

At step S916, the process 900b may perform the following: get user profile information from production and recreate similar user profile in QA using auto provisioning.

At step S918, the process 900b may perform the following: create Gherkin steps based on user actions.

At step S920, the process 900b may perform the following: execute user action (test scenarios).

At step S922, the process 900b may perform the following: triage and provide feedback.

According to exemplary embodiments, the ARGEM 306 as illustrated in FIG. 3 may be configured to implement the modules and processes disclosed herein with reference to FIGS. 4-9 for generating automated and unattended regression from behavioral analytics. For example, the ARGEM 306 as illustrated in FIG. 3 may be configured to implement the modules and processes disclosed herein with reference to FIGS. 4-9 for clustering user profile attributes data based on a common persona data from active customers using an application; recording behavioral analytics events data from the application based on the user profile attributes data; harvesting, in response to recording behavioral analytics events data, user journeys data taken by a pool of similar user profiles data; isolating each user journey data by splitting a user session into specific flows and actions; implementing a deduplication process to eliminate redundant data from each user journey data; augmenting each user journey data to fill in missing information and values based on the application's metadata or page inventory data; and outputting each user journey data in an executable human readable domain language that defines test scenarios and references profile attributes or generated test values.

For example, the ARGEM 306 may be configured to implement the modules and processes disclosed herein with reference to FIGS. 4-9 to: cluster user profile attributes data based on a common persona data from active customers using an application; define a query string which represents required values for the attributes based on the user profile attributes data, allocate users that match the defined query to corresponding persona in each system instance that needs to run test for the application; request a specific user for said persona when running the test so that an environment in which the test is running returns a valid user for said persona; and reference any dynamic values in the test by using said specific user profile's attributes or values.

According to exemplary embodiments, the recording behavioral analytics events data generated by the ARGEM 306 may further include: highlighting elements on an application's screen interacted with.

According to exemplary embodiments, isolating each user journey data by the ARGEM 306 may further include: implementing an algorithm to flatten an application's screen navigation graph into a tree structure; and extracting unidirectional user journeys data.

According to exemplary embodiments, augmenting the user journeys data by the ARGEM 306 may further include: identifying value types and what attributes they relate to in the profile.

According to exemplary embodiments, the executable human readable domain language developed by the ARGEM 306 may be an executable Gherkin syntax, but the disclosure is no limited thereto.

According to exemplary embodiments, the method implemented by the ARGEM 306 may further include: replaying the test scenarios and references profile attributes or generated test values for testing the application using persona definition of a user with similar attributes.

According to exemplary embodiments, the ARGEM 306 as illustrated in FIG. 3 may be configured to implement the modules and processes disclosed herein with reference to FIGS. 4-9 for generating generic persona definitions from clustered customer attributes. For example, the ARGEM 306 as illustrated in FIG. 3 may be configured to implement the modules and processes disclosed herein with reference to FIGS. 4-9 for clustering user profile attributes data based on a common persona data from active customers using an application; defining a query string which represents required values for the attributes based on the user profile attributes data; allocating users that match the defined query to corresponding persona in each system instance that needs to run test for the application; requesting a specific user for said persona when running the test so that an environment in which the test is running returns a valid user for said persona; and referencing any dynamic values in the test by using said specific user profile's attributes or values.

For example, generic persona definitions from clustered customer attributes may be utilized by the ARGEM 306 in any instance of a product without being tied to a specific user profile (Integration, QA, User Acceptance, Production, etc.).

Using customer databases from live products, the ARGEM 306 may harvest user attributes and cluster them find "common" populations of users with similar behavioral patterns. The ARGEM 306 then use these attributes to define a "Persona" that represents the features that set of users have access to in the product. Since this is a generic definition of a user (features available), it is not tied to a specific user ID or profile, and therefore becomes portable to be used in any implementation of the product. This allows a single unmodified test to run anywhere, without heavy maintenance of user profiles and user profile attributes. The abstraction of the user "contract" from the actual user may mean that one can leverage hundreds of identical users to run tests anywhere.

Typical test data is a major hurdle to implementing reliable test pipelines to validate the product throughout multiple stages in the test environment. Each "instance" of the product generally has different data, and keeping the user data in-synch can be a challenging task across large enterprise systems comprised of hundreds of individual components. Although synching users may be possible, but it may prove to be extremely time-consuming and may require constant maintenance. Further, it may be too slow to run thousands of tests many times a day, since the manual synching or even automated synching takes time or relies on synchronizing business events or batches as well. These variables adds additional difficulties in keeping in-synch in a reliable way. However, according to exemplary embodiments, the ARGEM 306 is configured to generate personas and archetypes that allow for bypassing the problems of conventional systems and methods disclosed above by using a definition of the user—rather than the user itself, and then collecting pools of users in each database that match that definition.

The ARGEM 306 can target to specific user profile or application feature. For example, the ARGEM 306 may identify a target user profile that represents a significant user population tagged by a Persona by clustering user profile attributes based on a common "persona" from active customers using the product. Based on this user profile, the ARGEM 306 defines a query string which represents the required values for the attributes; allocates users that match this query to the "Persona" in each system instance that needs to run test; requests a "User" for that Persona when the test is run—so the environment where the test is running will return a valid user for that "persona." The ARGEM 306 then references any dynamic values in the test by using that specific user profile's attributes/values. Test failure then no longer happens for out of date user profiles, making the testing more reliable.

According to exemplary embodiments, the ARGEM 306 as illustrated in FIG. 3 may be configured to implement the modules and processes disclosed herein with reference to FIGS. 4-9 for auto-provisioning of users or harvesting a user from a pool of available users. For example, the ARGEM 306 as illustrated in FIG. 3 may be configured to implement the modules and processes disclosed herein with reference to FIGS. 4-9 for monitoring in place and checking users against corresponding attribute definition of the user; determining, in response to monitoring, a tally of healthy users matching required profile for all downstream environments; creating, in response to determining, an executable human readable domain language that defines test scenarios and references profile attributes or generated test values, executing the test scenarios and providing test results; and triaging and providing feedback based on analyzing the test results.

According to exemplary embodiments, when a user does not match the required profile, the method implemented by the ARGEM 306 may further include: removing the user that does not match the required profile from the pool of available users; and sending a request to an auto-provisioning/conditioning engine to heal and have its attributes be restored to the correct state.

According to exemplary embodiments, wherein when a persona user count is low, the method implemented by the ARGEM 306 may further include: sending a request to an auto-provisioning/conditioning engine to create a new user profile to match the user profile requirements.

According to exemplary embodiments, wherein the required steps to create necessary user attributes is non-deterministic and requires multiple tries over a period of time.

According to exemplary embodiments, the method implemented by the ARGEM 306 may further include: tracking the period of time; and abandoning the steps to create necessary user attributes when count of errors exceed a predetermined count or the period of time exceeds a predetermined time.

According to exemplary embodiments, wherein in creating the new user profile, the method implemented by the ARGEM 306 may further include: calling a series of application programming interface (API) to source systems; and conditioning the new user profile to meet the profile needs by calling additional APIs on the source systems.

According to exemplary embodiments, wherein when a new user profile is created, the method implemented by the ARGEM 306 may further include: adding the new user profile to the pool of available users for performing the process of matching of attribute definition or the process of archetype query for harvesting the new user from the pool of available users; and regularly checking (i.e., within a preset time interval) the new user against corresponding attribute definition of the user.

According to exemplary embodiments, the ARGED 302 may include a memory (e.g., a memory 106 as illustrated in FIG. 1) which may be a non-transitory computer readable medium that may be configured to store instructions for implementing an ARGEM 306 for generating automated and unattended regression from behavioral analytics, generating generic persona definitions based on clustered customer attributes, and auto-provisioning of users that match the attribute definition of the user or harvesting the user from a pool of available users through a query language to find an appropriate user as disclosed herein. The ARGED 302 may also include a medium reader (e.g., a medium reader 112 as illustrated in FIG. 1) which may be configured to read any one or more sets of instructions, e.g., software, from any of the memories described herein. The instructions, when executed by a processor embedded within the ARGEM 306 or within the ARGED 302, may be used to perform one or more of the methods and processes as described herein. In a particular embodiment, the instructions may reside completely, or at least partially, within the memory 106, the medium reader 112, and/or the processor 104 (see FIG. 1) during execution by the ARGED 402.

For example, the instructions, when executed, may cause the processor 104 to perform the following: clustering user profile attributes data based on a common persona data from active customers using an application; recording behavioral analytics events data from the application based on the user profile attributes data; harvesting, in response to recording behavioral analytics events data, user journeys data taken by a pool of similar user profiles data; isolating each user journey data by splitting a user session into specific flows and actions; implementing a deduplication process to eliminate redundant data from each user journey data; augmenting each user journey data to fill in missing information and values based on the application's metadata or page inventory data; and outputting each user journey data in an executable human readable domain language that defines test scenarios and references profile attributes or generated test values, but the disclosure is not limited thereto.

According to exemplary embodiments, in recording behavioral analytics events data, the instructions, when executed, may further cause the processor 104 to perform the following: highlighting elements on an application's screen interacted with.

According to exemplary embodiments, in isolating each user journey data, the instructions, when executed, may further cause the processor 104 to perform the following: implementing an algorithm to flatten an application's screen navigation graph into a tree structure; and extracting unidirectional user journeys data.

According to exemplary embodiments, in augmenting the user journeys data, the instructions, when executed, may further cause the processor 104 to perform the following: identifying value types and what attributes they relate to in the profile.

According to exemplary embodiments, the executable human readable domain language developed by the processor 104 may be an executable Gherkin syntax, but the disclosure is no limited thereto.

According to exemplary embodiments, the instructions, when executed, may further cause the processor 104 to perform the following: replaying the test scenarios and references profile attributes or generated test values for testing the application using persona definition of a user with similar attributes.

According to exemplary embodiments, the instructions, when executed, may further cause the processor 104 to perform the following: clustering user profile attributes data based on a common persona data from active customers using an application; defining a query string which represents required values for the attributes based on the user profile attributes data; allocating users that match the defined query to corresponding persona in each system instance that needs to run test for the application; requesting a specific user for said persona when running the test so that an environment in which the test is running returns a valid user for said persona; and referencing any dynamic values in the test by using said specific user profile's attributes or values, but the disclosure is not limited thereto.

According to exemplary embodiments, the instructions, when executed, may further cause the processor 104 to perform the following: monitoring in place and checking users against corresponding attribute definition of the user; determining, in response to monitoring, a tally of healthy users matching required profile for all downstream environments; creating. in response to determining, an executable human readable domain language that defines test scenarios and references profile attributes or generated test values; executing the test scenarios and providing test results; and triaging and providing feedback based on analyzing the test results, but the disclosure is not limited thereto.

According to exemplary embodiments, when a user does not match the required profile, the instructions, when executed, may further cause the processor 104 to perform the following: removing the user that does not match the required profile from the pool of available users; and sending a request to an auto-provisioning/conditioning engine to heal and have its attributes be restored to the correct state.

According to exemplary embodiments, wherein when a persona user count is low, the instructions, when executed, may further cause the processor 104 to perform the following: sending a request to an auto-provisioning/conditioning engine to create a new user profile to match the user profile requirements.

According to exemplary embodiments, wherein the required steps to create necessary user attributes by the processor 104 is non-deterministic and requires multiple tries over a period of time.

According to exemplary embodiments, the instructions, when executed, may further cause the processor 104 to perform the following: tracking the period of time; and abandoning the steps to create necessary user attributes when count of errors exceed a predetermined count or the period of time exceeds a predetermined time.

According to exemplary embodiments, wherein in creating the new user profile, the instructions, when executed, may further cause the processor 104 to perform the following: calling a series of application programming interface (API) to source systems; and conditioning the new user profile to meet the profile needs by calling additional APIs on the source systems.

According to exemplary embodiments, wherein when a new user profile is created, the instructions, when executed, may further cause the processor 104 to perform the following: adding the new user profile to the pool of available users for performing the process of matching of attribute definition or the process of archetype query for harvesting the new user from the pool of available users; and regularly checking (i.e., within a preset time interval) the new user against corresponding attribute definition of the user.

According to exemplary embodiments as disclosed above in FIGS. 1-9, technical improvements effected by the instant disclosure may include eliminating the need to maintain regression scripts from one version of the product to the next, making the testing more reliable and always keeping the tests up to date. It allows the developers to focus on "change" rather than existing functionality—allowing this framework to highlight any anomalies that may occur between one product build version and another, but the disclosure is not limited thereto.

For example, according to exemplary embodiments as disclosed above in FIGS. 1-9, technical improvements effected by the instant disclosure may include platforms for generating personas and archetypes that allow for bypassing the problems of conventional systems and methods disclosed above by using a definition of the user—rather than the user itself, and then collecting pools of users in each database that match that definition. Exemplary embodiments utilize the user profile definition language to generate the required users through a series of user creation or identification, and then conditioning of that user to match the criteria needed. That is, the present disclosure, through one or more of its various aspects, embodiments, and/or specific features or sub-components implemented by FIGS. 1-9, also provides, among other features, various systems, servers, devices, methods, media, programs, and platforms for auto-creating user populations to ensure that there are enough users matching the requirements in each instance of the product. According to exemplary embodiments, the process of creating or finding users and then conditioning those users to match the attributes needed on the user profile have been automated.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating automated and unattended regression from behavioral analytics by utilizing one or more processors and one or more memories, the method comprising:
    clustering user profile attributes data based on a common persona data from active customers using an application;
    recording behavioral analytics events data from the application based on the user profile attributes data;
    harvesting, in response to recording behavioral analytics events data, user journeys data taken by a pool of similar user profiles data;
    isolating each user journey data by splitting a user session into specific flows and actions;
    implementing a deduplication process to eliminate redundant data from each user journey data;
    augmenting each user journey data to fill in missing information and values based on application's metadata or page inventory data; and
    outputting each user journey data in an executable human readable domain language that defines test scenarios and references profile attributes or generated test values.

2. The method according to claim 1, wherein recording behavioral analytics events data further comprising:
    highlighting elements on an application's screen interacted with.

3. The method according to claim 1, wherein isolating each user journey data further comprising:
    implementing an algorithm to flatten an application's screen navigation graph into a tree structure; and
    extracting uni-directional user journeys data.

4. The method according to claim 1, wherein augmenting the user journeys data further comprising:
    identifying value types and what attributes they relate to in the user profile.

5. The method according to claim 1, wherein the executable human readable domain language is an executable Gherkin syntax.

6. The method according to claim 1, further comprising:
    replaying the test scenarios and references profile attributes or generated test values for testing the application using persona definition of a user with similar attributes.

7. A system for generating automated and unattended regression from behavioral analytics, the system comprising:
    a repository that stores user profile attributes data; and
    a processor operatively coupled to the repository via a communication network, wherein the processor is configured to:
        access the repository to cluster the user profile attributes data based on a common persona data from active customers using an application;
        record behavioral analytics events data from the application based on the user profile attributes data;
        harvest, in response to recording behavioral analytics events data, user journeys data taken by a pool of similar user profiles data;
        isolate each user journey data by splitting a user session into specific flows and actions;
        implement a deduplication process to eliminate redundant data from each user journey data;

augment each user journey data to fill in missing information and values based on application's metadata or page inventory data; and output each user journey data in an executable human readable domain language that defines test scenarios and references profile attributes or generated test values.

8. The system according to claim 7, wherein to record behavioral analytics events data, the processor is further configured to:

highlight elements on an application's screen interacted with.

9. The system according to claim 7, wherein to isolate each user journey data, the processor is further configured to:

implement an algorithm to flatten an application's screen navigation graph into a tree structure; and extract uni-directional user journeys data.

10. The system according to claim 7, wherein to augment the user journeys data, the processor is further configured to:

identify value types and what attributes they relate to in the user profile.

11. The system according to claim 7, wherein the executable human readable domain language is an executable Gherkin syntax.

12. The system according to claim 7, wherein the processor is further configured to:

replay the test scenarios and references profile attributes or generated test values for testing the application using persona definition of a user with similar attributes.

13. A method for generating generic persona definitions from clustered customer attributes by utilizing one or more processors and one or more memories, the method comprising:

clustering user profile attributes data based on a common persona data from active customers using an application;

defining a query string which represents required values for the attributes based on the user profile attributes data;

allocating users that match the defined query to corresponding persona in each system instance that needs to run test for the application;

requesting a specific user for said persona when running the test so that an environment in which the test is running returns a valid user for said persona; and referencing any dynamic values in the test by using said specific user profile's attributes or values.

14. A method for auto-provisioning of users or harvesting a user from a pool of available users by utilizing one or more processors and one or more memories, the method comprising:

monitoring in place and checking users against corresponding attribute definition of the user;

determining, in response to monitoring, a tally of healthy users matching required profile for all downstream environments;

creating, in response to determining, an executable human readable domain language that defines test scenarios and references profile attributes or generated test values;

executing the test scenarios and providing test results; and triaging and providing feedback based on analyzing the test results.

15. The method according to claim 14, wherein when a user does not match the required profile, the method further comprising:

removing the user that does not match the required profile from the pool of available users; and sending a request to an auto-provisioning/conditioning engine to heal and have its attributes be restored to the correct state.

16. The method according to claim 14, wherein when a persona user count is low, the method further comprising:

sending a request to an auto-provisioning/conditioning engine to create a new user profile to match the user profile requirements.

17. The method according to claim 16, wherein the required steps to create necessary user attributes is non-deterministic and requires multiple tries over a period of time.

18. The method according to claim 17, further comprising:

tracking the period of time; and abandoning the steps to create necessary user attributes when count of errors exceed a predetermined count or the period of time exceeds a predetermined time.

19. The method according to claim 16, wherein in creating the new user profile, the method further comprising:

calling a series of application programming interface (API) to source systems; and conditioning the new user profile to meet the profile needs by calling additional APIs on the source systems.

20. The method according to claim 16, wherein when a new user profile is created, the method further comprising:

adding the new user profile to the pool of available users for performing the process of matching of attribute definition or the process of archetype query for harvesting the new user from the pool of available users; and regularly checking the new user against corresponding attribute definition of the user.

* * * * *